US010089765B2

(12) United States Patent
Martinez-Avalos (10) Patent No.: US 10,089,765 B2
(45) Date of Patent: Oct. 2, 2018

(54) METHODS AND COMPUTER PROGRAMS TO CREATE IMAGES AND INFORMATION BASED IN TEXTS

(71) Applicant: Bernardo Jose Martinez-Avalos, Mexico City (MX)

(72) Inventor: Bernardo Jose Martinez-Avalos, Mexico City (MX)

(*) Notice: Subject to any disclaimer, the term of this patent is extended or adjusted under 35 U.S.C. 154(b) by 0 days.

(21) Appl. No.: 14/918,515

(22) Filed: Oct. 20, 2015

(65) Prior Publication Data
US 2017/0109914 A1 Apr. 20, 2017

Related U.S. Application Data

(60) Provisional application No. 62/065,887, filed on Oct. 20, 2014.

(51) Int. Cl.
*G06T 11/60* (2006.01)
*G06F 17/30* (2006.01)
*G06T 11/20* (2006.01)

(52) U.S. Cl.
CPC ............. *G06T 11/60* (2013.01); *G06F 17/30* (2013.01); *G06F 17/30616* (2013.01); *G06T 11/206* (2013.01)

(58) Field of Classification Search
CPC .. G06T 11/20; G06T 11/206; G06F 17/30616; G06F 3/04842
See application file for complete search history.

(56) References Cited

U.S. PATENT DOCUMENTS

| 5,987,460 | A | * | 11/1999 | Niwa | G06F 17/30696 |
| 6,360,227 | B1 | * | 3/2002 | Aggarwal | G06F 17/30873 |
| 6,424,971 | B1 | * | 7/2002 | Kreulen | G06F 17/3071 |
| | | | | | 707/737 |
| 7,359,891 | B2 | * | 4/2008 | Nishino | G06F 17/30884 |
| 7,606,418 | B2 | * | 10/2009 | Mizoo | G06F 17/2785 |
| | | | | | 382/176 |
| 7,624,011 | B2 | * | 11/2009 | Fukada | G10L 15/00 |
| | | | | | 701/532 |
| 8,010,342 | B2 | * | 8/2011 | Uchimoto | G06F 17/277 |
| | | | | | 704/1 |
| 2003/0195885 | A1 | * | 10/2003 | Emmick | G06F 17/30917 |
| 2004/0004617 | A1 | * | 1/2004 | Street | G06F 11/321 |
| | | | | | 345/440 |
| 2005/0125431 | A1 | * | 6/2005 | Emmick | G06F 17/30917 |

\* cited by examiner

*Primary Examiner* — Michelle L Sams
(74) *Attorney, Agent, or Firm* — Brundidge & Stanger, P.C.

(57) ABSTRACT

This invention refers to methods and computer programs which input is a text and outputs are images, sounds and information related with text. User defines rules and parameters to accomplish his expectations. The text source can be anything having written text, like books or anything that has written symbols using any language. By means of iterations, changing rules, algorithms and expectations allows to achieve useful or beautiful images to be used for artistic, commercial or educational proposes. As implementations are two computer programs that take the Bible as source giving the option to select the text and the rules to generate the images and information. One program is focus on numbers mentioned in the Bible and second in words, letters and numbers regarding a single verse selected by user. This methods and programs can be used as source not only the Bible but any book.

11 Claims, 9 Drawing Sheets

FIG. 1

| Slides of Text | Positions | X values | Y values | Scripts |
|---|---|---|---|---|
| t | 1 | 1 | 20 | Draw Line ( 1, 0) ( 1,20) |
| h | 2 | 2 | 8 | Draw Line ( 2, 0) ( 2, 8) |
| e | 3 | 3 | 5 | Draw Line ( 3, 0) ( 3, 5) |
| q | 4 | 4 | 17 | Draw Line ( 4, 0) ( 4,17) |
| u | 5 | 5 | 21 | Draw Line ( 5, 0) ( 5,21) |
| e | 6 | 6 | 5 | Draw Line ( 6, 0) ( 6, 5) |
| e | 7 | 7 | 5 | Draw Line ( 7, 0) ( 7, 5) |
| n | 8 | 8 | 14 | Draw Line ( 8, 0) ( 8,14) |
| r | 9 | 9 | 18 | Draw Line ( 9, 0) ( 9,18) |
| e | 10 | 10 | 5 | Draw Line (10, 0) (10, 5) |
| t | 11 | 11 | 20 | Draw Line (11, 0) (11,20) |
| u | 12 | 12 | 21 | Draw Line (12, 0) (12,21) |
| r | 13 | 13 | 18 | Draw Line (13, 0) (13,18) |
| n | 14 | 14 | 14 | Draw Line (14, 0) (14,14) |
| s | 15 | 15 | 19 | Draw Line (15, 0) (15,19) |
| f | 16 | 16 | 6 | Draw Line (16, 0) (16, 6) |
| i | 17 | 17 | 9 | Draw Line (17, 0) (17, 9) |
| n | 18 | 18 | 14 | Draw Line (18, 0) (18,14) |
| d | 19 | 19 | 4 | Draw Line (19, 0) (19, 4) |
| s | 20 | 20 | 19 | Draw Line (20, 0) (20,19) |
| t | 21 | 21 | 20 | Draw Line (21, 0) (21,20) |
| h | 22 | 22 | 8 | Draw Line (22, 0) (22, 8) |
| e | 23 | 23 | 5 | Draw Line (23, 0) (23, 5) |
| k | 24 | 24 | 11 | Draw Line (24, 0) (24,11) |
| i | 25 | 25 | 9 | Draw Line (25, 0) (25, 9) |
| n | 26 | 26 | 14 | Draw Line (26, 0) (26,14) |
| g | 27 | 27 | 17 | Draw Line (27, 0) (27, 7) |

| Slides of Text | Line | End point | Scripts |
|---|---|---|---|
| t | 1 | 20<18° | Draw Line (0<0°) (20< 18°) |
| h | 2 | 8<36° | Draw Line (0<0°) ( 8< 36°) |
| e | 3 | 5<54° | Draw Line (0<0°) ( 5< 54°) |
| Queen | 4 | 35<72° | Draw Line (0<0°) (35< 72°) |
| r | 5 | 18<90° | Draw Line (0<0°) (18< 90°) |
| e | 6 | 5<108° | Draw Line (0<0°) ( 5<108°) |
| t | 7 | 20<126° | Draw Line (0<0°) 20(<126°) |
| u | 8 | 21<144° | Draw Line (0<0°) (21<144°) |
| r | 9 | 18<162° | Draw Line (0<0°) (18<162°) |
| n | 10 | 14<180° | Draw Line (0<0°) (14<180°) |
| s | 11 | 19<198° | Draw Line (0<0°) (19<198°) |
| f | 12 | 6<216° | Draw Line (0<0°) ( 6<216°) |
| i | 13 | 9<234° | Draw Line (0<0°) ( 9<234°) |
| n | 14 | 14<252° | Draw Line (0<0°) (14<252°) |
| d | 15 | 4<270° | Draw Line (0<0°) ( 2<270°) |
| s | 16 | 19<288° | Draw Line (0<0°) (19<288°) |
| t | 17 | 20<306° | Draw Line (0<0°) (20<306°) |
| h | 18 | 8<324° | Draw Line (0<0°) ( 8<324°) |
| e | 19 | 5<342° | Draw Line (0<0°) ( 5<342°) |
| King | 20 | 30<360° | Draw Line (0<0°) (30<360°) |

METHODS AND COMPUTER PROGRAMS TO CREATE IMAGES AND INFORMATION BASED IN TEXTS

CROSS-REFERENCE TO RELATED APPLICATION

This application claims the benefit of U.S. provisional application No. 62/065,887 filed on Oct. 20, 2014.

BACKGROUND

Since humans invented the writing has been many ways to present the documents, letters, books or any other writing material. Typography is the technique that makes the letters and symbols most appealing and make the reading more attractive. Many books have been illustrated presenting some scenes, characters or the environment within the book using drawings, comics or photographs. The bookbinding uses a lot of techniques to make the book something attractive, colors, paper, size and cover are very important to present and make books attractive. Schools, religious groups, artists and publishers have been using different figures, paintings, films, cartoons, photographs or other images to promote reading. Presently it is needed a new way to promote the lecture by means of images and sounds more attractive and impressive, giving additional information that make more people to take an interest.

Presently in all the material used to promote books or magazines or any other text there is not participation of users which only see, reads or listen without any other participation in the creation of the material.

The Bible mentions thousands of numbers which mathematical, philosophical, historical and theological meaning is enormous for humanity but presently there is not a tool focused to find, analyze and graph the thousands of numbers mentioned in the Bible. Besides to have statistics about letters, words and other symbols it is needed a tool with graphical presentations that encourages people to read and investigate more about this book. Same happens with other books and other written texts.

SUMMARY

This invention achieve a new way to promote a book or any other written item without reproduce the characters, scenes, words or symbols of the original work, it is is done by means of images that can be graphics, sounds, music, figures, paintings, sculptures, structures, building, choreography or any other form, material or item that can be seen or felt, regardless of the language used, theme or size.

By means of this invention user participates generating images related with any text and its iterative method awakens creativity generating useful images to be use for educational proposes, joy, art or publicity. When user sees the images generated by means of this invention and thinks or reflects that were created using as source a great book, or a speech from a hero, or a song or even a personal letter, will have special feelings and emotions that motivates to read more, investigate and make a lot of questions about the figures and sources. The quantity of figures and shapes has no limit and give a lot of options to achieve the expectations of the user. The invention can take as a source any book, having any content, symbols or size.

To make possible to analyze deeply the Bible, this invention, as one of the many possible implementations, includes computer program that draws graphics, make sounds and displays information about all the numbers in the Bible. Another application which is described here is a second computer program that generates images, sounds and gives information related with the text of any verse selected by user from the Bible. The graphics generated by this inventions are not only attractive but sometimes impressive, therefore it will motivate its reading, survey and interpretation of the graphics and numbers. Besides it is a source of inspiration for painters, musicians, sculptors, craftsmen and architects.

The same method and computer programs can be used for any other book or any written document.

By means of this method user selects a source, inside the source takes a text, then gives values to words, letters and symbols. Then regarding rules and mathematical algorithms created or selected by him, objects that will represent letters, numbers or words, are created and then this set of objects are assembled to form an image which is seen, hear, touch or sense by user. Based in his expectations user decides if the image fulfils the expectations if not an interactive process starts finishing when expectations are fulfilled. Two computer programs described here do this tasks automatically, making iterations until the expectations are fulfilled. Taking the Bible as a source one computer program presents images related with the numbers mentioned in this book giving the user many options to select the verses and ranges of numbers to be considered. A second program allows user to select one verse and generate images based in special words, letters and numbers. Both programs generate information about the quantity of words, letters and numbers as well as explanation about the images. With same method and computer program any book or written document can be used to achieve same results.

DETAILED DESCRIPTION

Figure 1:
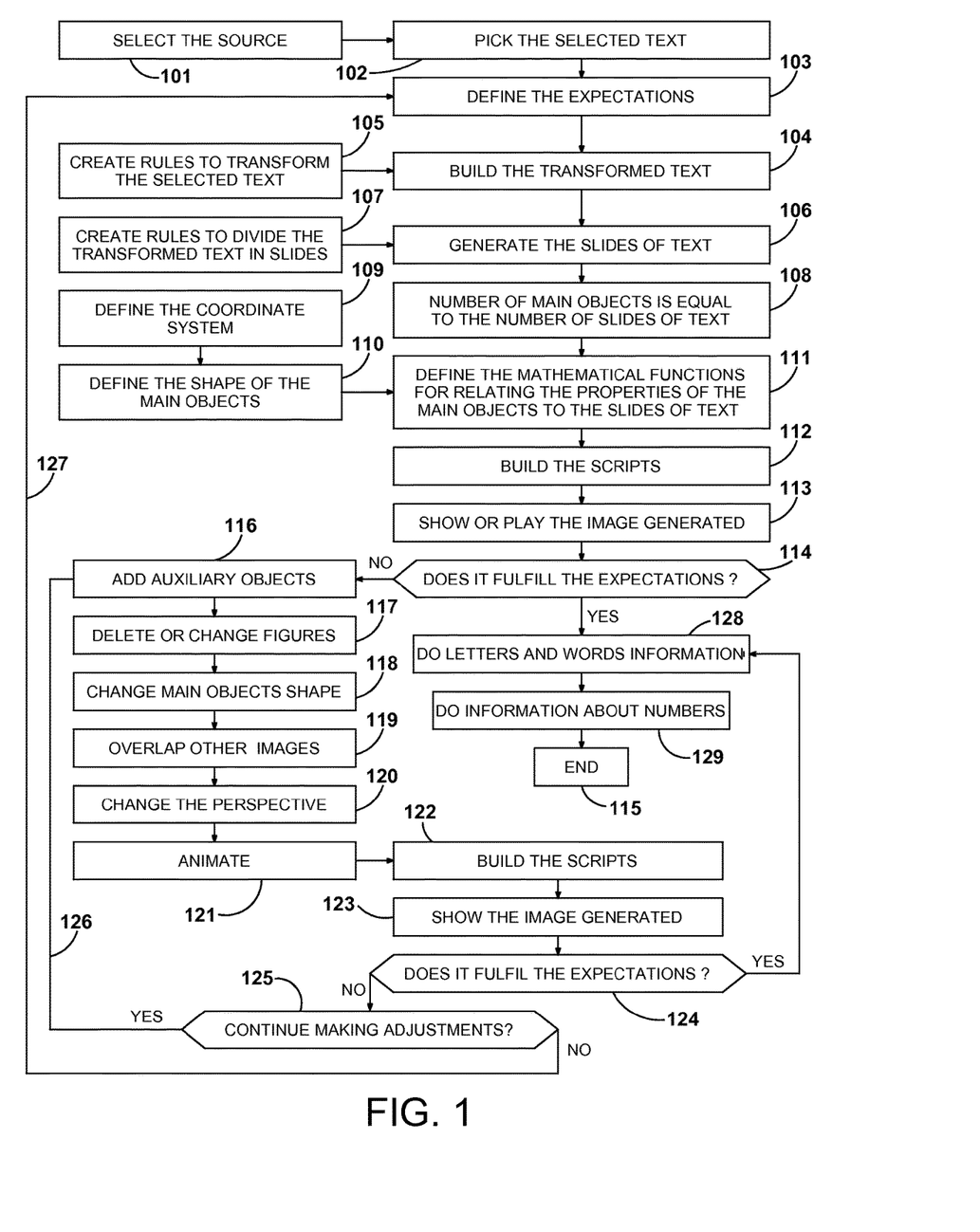
FIG. 1 is a block diagram of the method.

FIG. 1 is a block diagram that illustrates the method. "User" is the person or persons or machines that uses the invention and is who generates images using as input a text, understanding as "text" a collection of letters, symbols, punctuation marks or any other thing that is used in languages. The images obtained by means of this invention are called "Generated Images", this can be drawn by hand or plotted in a two dimensions ("2D") or three dimensions ("3D") printer or to be a figure made by any material or even be a big building or a structure or a sculpture. A Generated Image can be sounds or music as well. A Generated Image can be a mixture of images like sounds and colors.

The first task is to make the selection of the "Source" at block 101, the Source can be a book, a song, a speech, or a magazine, or any other document that has a text. Other examples but not limitative are: a mix of different documents, many books added, a mix of a song and a text in a book, or a text written by the User. Then at block 102 the "Selected Text" is picked from the Source, Selected Text can be a part of the Source, the complete Source, or different parts not consecutive of the Source.

User can use the method with the help of a computer or not, if so the Source and the Selected Text can be chosen using any commercial text processor. This invention is not limited to the use of a computer, all the steps can be done by hand (i.e. without a computer). The use or not of a computer depends of the situation but it is well known the advantages to use a computer. As one example of a special situation when the User does not use a computer is if as a feature of the Image Generated is that "all was done by hand without electricity" which is attractive in some cases.

Then at block 103 the "Expectations" are defined, Expectations are what the User or any other person would like to see, to listen or to feel about the Generated Image. As examples, but not limitative, of Expectations are: "to see a beautiful image", other can be "to see figures that make him to remember the text or the author" or can be that the Generated Image "looks like a flower" or "like a car" or "like a cloud" or any other thing. Other examples of Expectations which are very subjective are when User wants to see "something that inspires" or "something that gives special emotions" or "something attractive" or "something impressive", "sounds that inspires to compose a song". Some Expectations are very subjective similar to an artist that is going to create a song, painting or a sculpture.

The "Transformed Text" is built at block 104 from the Selected Text and regarding the rules created by the User at block 105. Then the Transformed Text is divided in "Slides of Text" at block 106, User creates the rules at block 107 to make this division.

The "Main Objects" are the collection of graphic or physical elements that are related with the Slides of Text. Each Main Object is going to represent a Slide of Text, therefore, the number of Main Objects is equal to the number of Slides of Text, at block 108 this is registered.

At block 109 User defines the coordinate system where the Generated Image will be located, this can be Cartesian, Polar, logarithmic or any other in 2D or 3D.

Each Main Object has a shape, this can be a point, a line, circle, square, sphere or any in other form or physical object in 2D or 3D. The shape or shapes are defined at block 110. The shape can be the same for all the Main Objects or each one have its own. The selection of the shape includes attributes like color, temperature or any other property to be seen, heard, smelled or felt. Frequency and intensity of acoustic waves could be properties of the Main Objects and be used to generate music.

Each Main Object has geometrical properties that defines their position and dimensions inside the coordinated system. The User defines at block 111 the "Mathematical Functions" for relating the properties of the Main Objects to the Slides of Text. If the Generated Images will be sounds, is here where is defined the relationship that will be with the frequency and intensity of the acoustic waves to produce sounds or music. The frequency of the sounds is calculated in function of the length of the objects multiply by a constant.

With shape and geometrical properties of Main Objects "Scripts" are built at block 112. The scripts are instructions to make a computer or a human to draw, build, construct, make sounds, or show the Generated Image to be seen or felt. The Script format has a command and parameters, for example:

"Draw a Point, Position(12,33)" is one script, where:

"Draw a Point" is the command.

"Position (12,33)" is the parameter having coordinates.

In the case of the use of a computer, the Scripts syntax depends of the the commercial drawing software used. Scripts can be done to be taken by artists, painters or craft builders to make paintings or any 3D figure. Even an architect or a civil engineer can take the Scripts to construct big structures or buildings. A sculptor can create a work of art using the Scripts as well. Or a choreographer can make a dance or any other artistic work. A musician or a simple tone generator can take Scripts to generate sounds or music.

At block 113 the Generated Image is shown or play in the case of sounds, drawn or built to be seen, felt and analyzed by User. At block 113 User can play sounds or music as well. User decides if the Generated Image fulfills the Expectations at block 114. If so, next step is to generate information about words, symbols and letters at block 128, then at block 129 generate information about the numbers mentioned in the Selected Text. At blocks 128 and 129 output is other text.

And then go to the end at block 115. Besides at block 113 user can hear sounds and decides if this sounds fulfills the expectations or use them as inspiration to generate music.

The experience that any person feels seeing, hearing or feeling the Generated Image is extraordinary because User knows that the Generated Image was done regarding a text that could have been written by a genius of literature, or was a speech of historical person or a magazine article, or it was a song, a newspaper front page or any other mixture of letters and symbols. Therefore, the creativity arises, User is motivated to continue creating other image after the end at output block 115 or if the current Generated Image does not fulfill the Expectations, User is going to adjust or adequate the Image at blocks 116 to 121. As an option to try to fulfill the Expectations user can add to the Generated Image ornaments or "Auxiliary Objects" at block 116, these can be to add new lines or circles or any other figure to the image.

Other adjustment can be to delete or change any figure within the Generated Image or make both at block 117. The shape of Main Objects may be changed at block 118 to highlight one, many or all, or change the colors, or change lines to rectangles. Other possible action is to overlay at block 119 other "Generated Images" previously made. Other task that can be done is to change at block 120 the point of view of the observer to see the Generated Image in other perspective. Use animation at block 121 to continuously move the Image is another option.

At block diagram there are optional steps and mandatory, blocks 116 to 121 are optional because the Generated Image is already done and User is looking to achieve the Expectations making ornamental changes. As it will be explained next the other blocks are mandatory only if it is the first time they are going to be done.

At block 122 the new Scripts are build, next the new image is showed at block 123 and User is able to decide at block 124 if with the changes made the new Generated Image fulfils now the Expectations. If so, goes to blocks 128 and 129 to generate or do information and then to go the end at output block 115. If Expectations are not fulfilled User goes at block 125 to decide if continues making adjustments taking the branch 126 or goes to through branch 127 at block 103 again to make deeper changes.

The information generated about of letters and words at block 128 includes data like the most frequently, the less frequently, its quantity, in which part of the Selected Text are located, the frequency of each one, the letters not used and all the statistic data needed by User. Books like the Bible has thousands of numbers within its argument, at block 129 numbers are registered and counted together with all their characteristics and statistics. The information about words, letters, symbols, numbers and any other is done and presented to the User at blocks 128 and 129.

If User goes from 125 to 103 taking the loop closed by branch 127 does not mean to start from scratch because an image was already generated and User should have new ideas, like to create new rules at blocks 105 and 107, or to change the Mathematical Functions at block 111 or even change the Expectations at block 103. When User is going to make a task for a second or more time it became optional, for instance, maybe only changing the rules to divide the text at block 107 is enough to fulfill the Expectations and other blocks are skipped.

If User is going to produce Images that sounds at block 111 there are the mathematic functions to generate audible frequencies from 20 to 20,000 Hz. This sounds can be music.

The two loops of this invention, one closed by branch 126 to adjust and the other using branch 127 to make deeper changes are both creative process because each time the User sees the Generated Image will have new ideas. There are not limit in the number of loops to make the Generated Image more beautiful, or more inspirational or useful to achieve the Expectations. That is why this invention is useful to create art, publicity or inspirational material. The more loops User does the more ideas he will have. A music composer or arranger can make many loops until achieve the sounds expected.

User can decide to start from block 101 and change the Source or mix Sources and generate images based in them. For instance, to mix two books having an image that now is inspired by the talent of not one genius of literature but two. Other possibility is to mix speeches of different historical persons that were or are opponents. Or mix a text written for any person with a famous literature text, for instance, to mix one scene of Romeo and Juliet with a love letter that a husband writes to his wife and then by means of this invention make a printed figure in a 3D printer and give to her as an anniversary gift.

Compare two ore more Generated Images using same books but written in different languages is another alternative to generate images and compare or overlap them.

This method is applicable for any type of writing system like those used for Nahuatl, Hebrew, Greek, Aramic, Chinese, Japanese, Arabic, Latin, Korean, Russian, Spanish, English, French or any other used currently or before.

Implementation using as Selected Text a short sentence.

The following implementations and examples are not limitative of the scope of this invention. As a first example User selects a short sentence from a very famous book. selecting at block 101 the following Source:

Author: William Shakespeare

Book: Hamlet

This book selected as the Source has many acts and scenes, the Selected Text at block 102 is taken from Act III, Scene II and to make the example as simple as possible, from this scene next short sentence is taken as the Selected Text:

"The Queen returns, finds the King"

Then, the next two subjective Expectations are defined at block 103:

1—The Generated Image shall be beautiful.

2—The image shall say something graphically about the content of the Selected Text.

To build the Transformed Text the following two rules are created at block 105:

1—To eliminate all the punctuation marks like periods and commas.

2—To convert all letters to lowercase.

Therefore, the Transformed Text after block 104 is:

"the queen returns finds the king"

At block 106 the Transformed Text is divided in Slides of Text, regarding the rules that are created at block 107 which are the next two:

1—Each single letter of the sentence is a Slide of Text.

2—Spaces are not going to be considered.

Figure 2A:
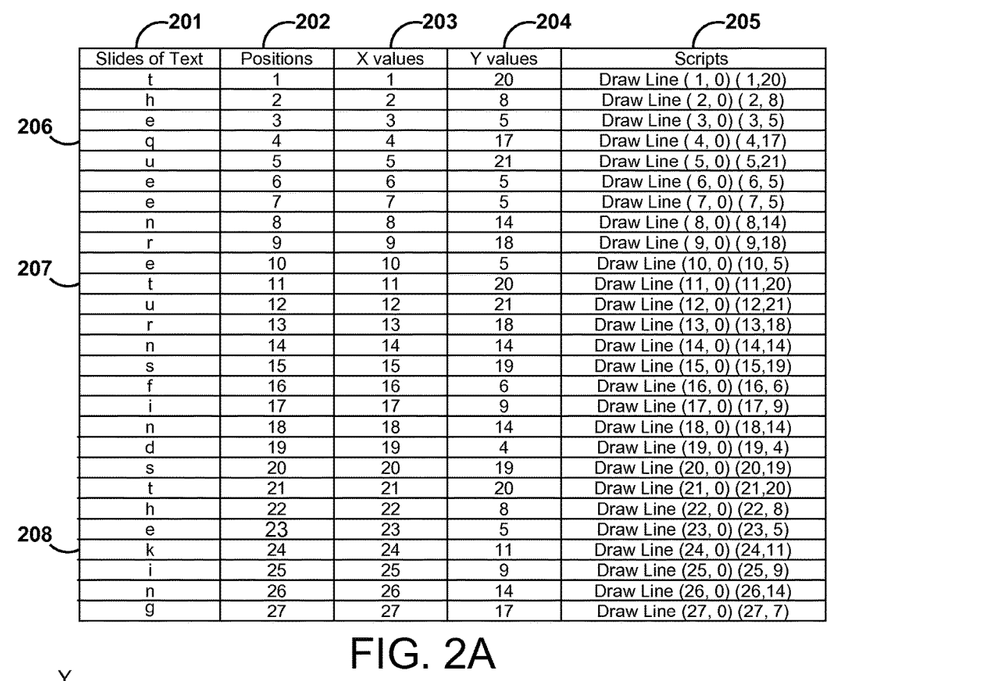
FIG. 2A is a table that shows some outputs of the method using as a Selected Text a short sentence and Cartesian coordinate system.

The output at block 106 gives 27 Slides of Text which are at FIG. 2A column 201 and their positions are at column 202. The number of Basic Objects is equal to the number of Slides and is registered at block 108. At block 109 two-dimensional Cartesian system is selected. At block 110 the shapes selected for all The Main Objects are equal having the following properties:

1—Straight lines, all with same width.

2—Black color.

At block 111 the "Mathematical Functions" for relating the Slides of Text to the properties of the Main Objects are defined as follows by User:

1—The location and length of each straight line are defined by two points (the first point and the second point), each point has a value for the coordinate X and the value for coordinate Y.

2—Algorithm for the first point of each line: X value will be equal to the position of the Slide of Text (column 202), and the Y value will be zero.

3—Algorithm for the second point of each line: X value will be equal to the X value of the first point defined above. The Y value will be equal to its position in the English alphabet, for instance, if Slide of Text is equal to "a" Y value is 1, for "b" Y is equal to 2, for "c" Y is equal to 3 and so on.

Numerically the Mathematical Functions for relating the 27 Slides of Text to the properties of the Main Objects are at column 203 for X values and at column 204 for Y values. The Scripts are at column 205 and are built at block 112 based in the numerical values. For this example the Scripts to draw have the following syntax:

Draw Line (X1,Y1) (X2,Y2)
where,
(X1,Y1) are coordinates of point 1.
(X2,Y2) are coordinates of point 2.

For example, second Slide of Text equal to "t" has the position 11 and Main Object is drawn by means of the next Script, which located at row 207 column 205:

Draw Line (11,0) (11,20)

Figure 2B:
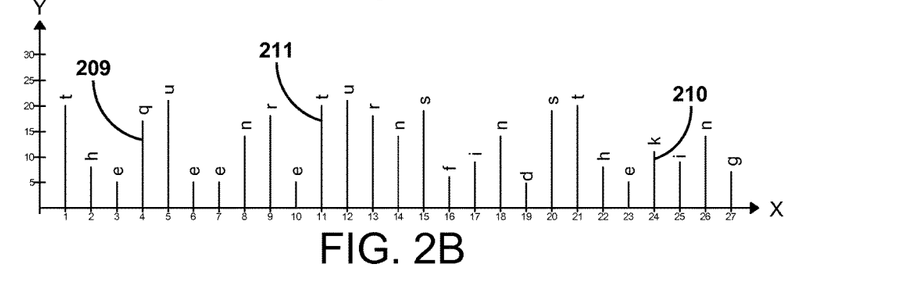
FIG. 2B and FIG. 2C are the Generated Images using as a Selected Text a short sentence and Cartesian coordinate system.

Previous script is to draw a line that represents the Slide of Text "t" which is seen at FIG. 2B line 211. At block 113 by means of the 27 Scripts with any computer and any commercial drawing software or even by hand it is possible to draw all the 27 lines and have the Generated Image as seen at FIG. 2B where, for instance, line 209 represents the first letter of the word "Queen" taking its coordinates from row 206, and line 210 represents the first letter of the word "King" taking its coordinates from row 208. Then at block 114 User decides if the Generated Image fulfills the Expectations, this can be a subjective decision or use an image detection software not to decide if the image is beautiful but to detect some special forms.

Let's suppose that User takes a subjective decision about the Expectations and for him nor the "image is beautiful" neither "says something graphically about the content of the Selected Text" which were the two expectations defined above for this example. Therefore, User decides that answer is "NO" and to make some of the adjustments of blocks 116 to 121. This will give as a result a new Image Generated which can be seen at FIG. 2C, at block 116 Auxiliary Object 215 is added to link all the second points of the lines and Auxiliary Object 212 is added to link the first points of the lines. At block 117 the axis and numbers are eliminated. At block 118 width of Main Objects that represents the first letter of the words "Queen" and "King" are made thicker to increase the relationship of the Image with the Selected Text, so, Main Objects that represent the letters "q" line 213 and "k" line 214 are thicker than the other vertical lines. Blocks 119, 120 and 121 are skipped. Then Scripts are built at block 122 and figure is drawn at block 123.

Figure 2C:
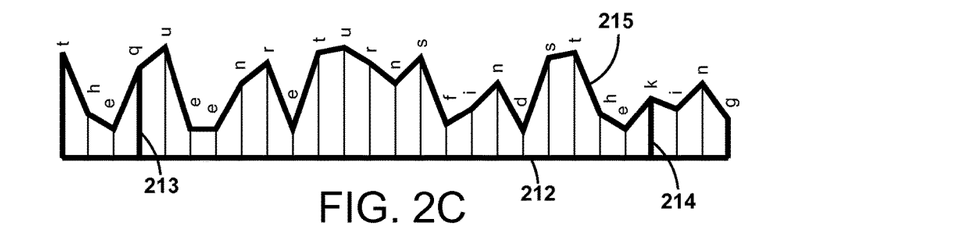

User has to decide at block 124 if with this adjustments done the Image Generated fulfills the Expectations, for this example the answer is "NO" because User has new ideas to fulfill the Expectations, then at block 125 decides "NO" as well. Then User goes through branch 127 to block 103 again to start to make deeper changes. At block 103 User decides to keep the two previous Expectations which were:

1—The Generated Image shall be beautiful.
2—The image says something graphically about the content of the Selected Text.

But adds more three more Expectations:

3—Due the importance of the Queen in the book, the Main Object that represents the word "Queen" shall be the largest in the graphic.
4—Due the importance of the King in the book, the Main Object that represents the word "King" shall be the second largest in the graphic.
5—All Main Objects shall be represented by lines that converge in one single point.

Here is when it is demonstrated that this invention motivates the creativity, the User has new ideas at this point not only to achieve the first two Expectations but to add three more. The creativity process will continue in the following blocks but such as it was explained all the tasks done for second or more times are optional. To build the Transformed Text the following new rules are created at block 105 where the new Expectations about the words "Queen" and "King" are considered:

1—To eliminate all the punctuation marks like period and commas.
2—To convert all letters to lowercase except for the words "Queen" and "King".

So, the Transformed Text after block 104 is:
"the Queen returns finds the King"

At block 106 the Transformed Text will be divided in Slides of Text regarding new rules that are created at block 107, which are:

1—All the letters of the word "Queen" will be only one Slide of Text.
2—All the letters of the word "King" will be only one Slide of Text.
3—The other words (i.e.: not "Queen" and not "King") will be divided in letters and each single letter will be a Slide of Text.
4—Spaces will be eliminated.

Figure 3A:
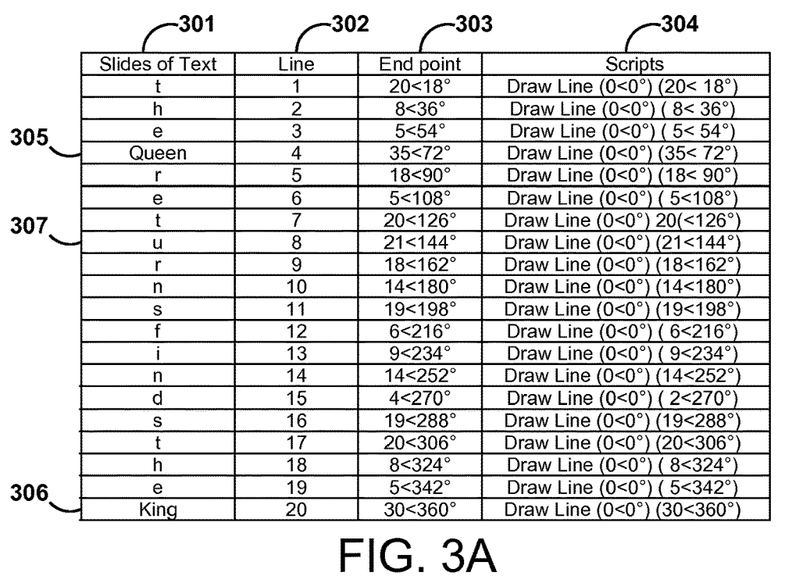
FIG. 3A is a table that shows some outputs of the method using as a Selected Text a short sentence and polar coordinate system.

The result after block 106 are 20 Slides of Text which can be seen at FIG. 3A column 301 where there are 20 Slide of Text now. Slide of Text 4 is the word Queen located at row 305, Slide of Text 20 is the word "King" located at row 306 and the rest 18 are single letters. The number of Main Objects is equal to the number of Slides and is registered at block 108.

Because the Expectation five is "All Main Objects shall be represented by lines that converge in one point" at block 109 the coordinate system selected will be polar. The shape of Main Objects do not change, therefore, at block 110 nothing is done. At block 111 the Mathematical Functions for relating the Slides of Text to the properties of the Main Objects have to change and be as follows.

All the lines that represents the Main Objects will have as first point the coordinates (0,0).
The end point of each line will be given in polar notation (i.e. magnitude and angle).
The magnitude is as follows:
If the Slide of Text is equal to "Queen" then, magnitude of the end point will be equal to 35.
If the Slide of Text is equal to "King" then, magnitude of the end point will be equal to 30.
if the Slide of Text is equal to a single letter, its magnitude will be equal to its position in the alphabet, therefore, if it is equal to "a" value will be 1, "b" equal to 2, "c" equal to 3 and so on.
To evaluate the angle lets define "Delta" as the angular distance between Main Objects, since its quantity is equal to 20, Delta is equal to 18 (i.e.: 360 divided by 20). Therefore, the angle of each Main Object will be equal to the line number at 302 multiplied by Delta.

At FIG. 3A column 301 are the Slides of Text, each of one is represented by a line which number is at column 302. All the lines have the same origin at point (0,0) and the end points are at column 303.

Since Expectations for "Queen" and "King" are to have bigger magnitudes than the letters, as seen at row 305 column 303 (for "Queen") and row 306 column 303 (for "King"), their magnitudes are 35 for "Queen" and 30 for "King".

Row 307 has the values for the Slide of Text "u" which is the longest value for a single letter. At block 112 are built the Scripts which are at column 304.

Figure 3B:
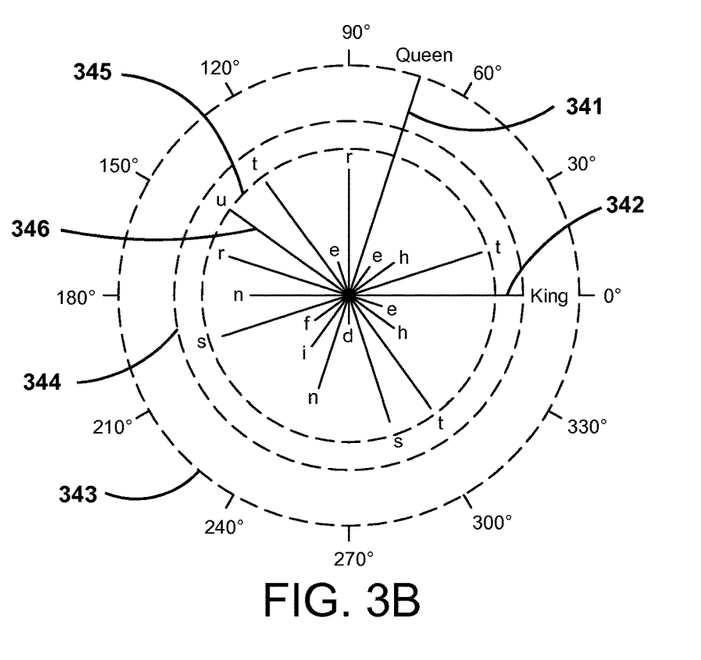
FIG. 3B, FIG. 3C and FIG. 3D are the Generated Images using as a Selected Text a short sentence and polar coordinate system.

At block 113 Image Generated is drawn to be seen by User, which is shown at FIG. 3B.

Some comments about the FIG. 3B are as follows:

Line 341 represents the Slide of Text "Queen", line 342 represents "King". All the Slides of Text that are a single letter are inside the circle 345, among the lines that represent single letters is line 346, letter "u" of the word "returns" that as seen in row 307 has the longest value between single letters. The circle 344 has longer radii than circle 345 because the length of the line 342 that represents "King" is longer than line 346. The longest radii belongs to the circle 343 because its radii is equal to the length of line 341 that represents "Queen".

This description could be larger and together with the way graphic was done is a method to relate a Generated Image to Selected Text. It is like to make another different argument called here "New Text" based in the Generated Image. To generate the New Text first is the original Selected Text, second is the data to generate the image, third is the Generated Image and fourth the New Text is created describing the image. This New Text is very useful to motivate creativity.

The Generated Image and the New Text are completely different to the original work but are related.

Figure 3C:
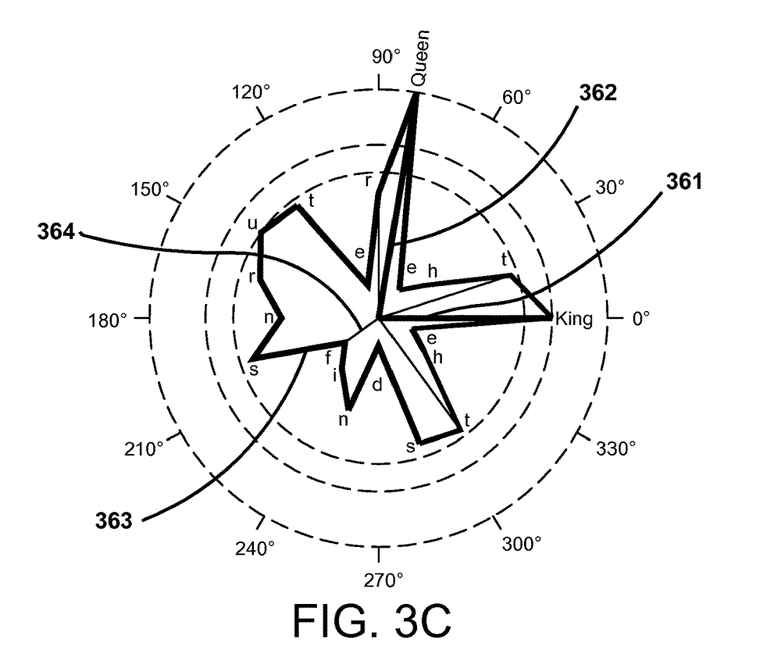
Figure 3D:
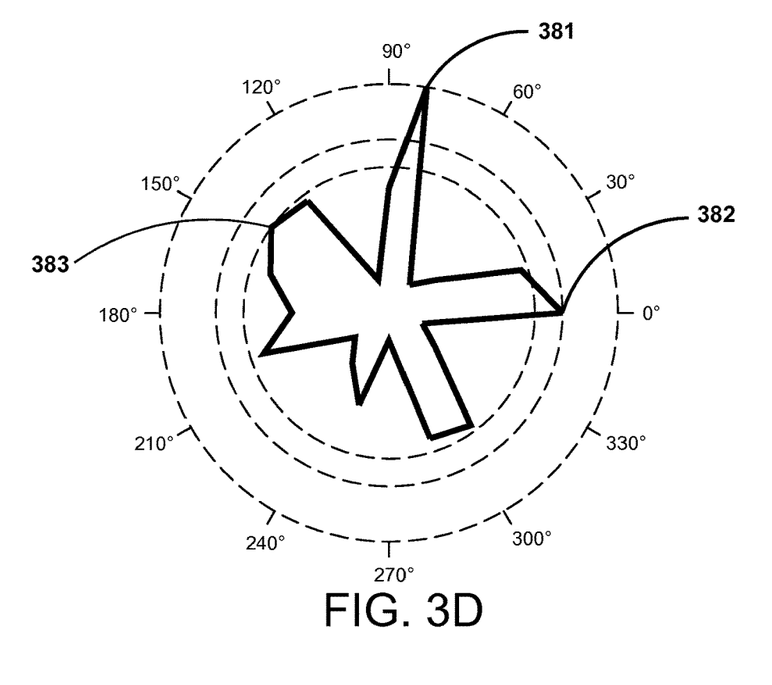

FIG. 3B is more compatible with the Expectations and tells more about the Selected Text, but for this example User decides at block 114 that expectations are not fulfilled yet and to do the adjustments beginning at block 116 adding the Auxiliary Object 363 shown at FIG. 3C that links all the end points. At block 117 deletes all the concentric lines except those that represents the first letter of all the words like line 364 that represents the letter "f" which is the first letter of the word "finds". At block 118 makes thicker the Main Objects that represents the Slide of Text "Queen" 362 and "King" 361. Then blocks 119, 120 and 121 are skipped. Scripts are built at block 122 and the Generated Image FIG. 3C is shown (block 123). User decides at block 124 and 125 that the image FIG. 3C needs only one more adjustment so goes to the branch 126, skips block 116, at block 117 deletes all the concentric lines, the words and the letters, then skips blocks 118, 119, 120 and 121. Then builds the scripts at block 122 and show the image at block 123 which is seen at FIG. 3D. Since all the letters and words were eliminated, only point 381 represents the Slide of Text "Queen", only point 382 represents the Slide of Text "King" and only point 383 represents the letter "u". And now at block 124 decides that the Generated Image fulfils all the Expectations going to blocks 128, 129 and 115 that is the end. As seen at FIG. 3D the Generated Images not always has the original text in it.

Letters and words information is made at block 128 and is as follows:

Times "Queen" is mentioned equal to 1.
Times "King" is mentioned equal to 1.
Number of words equals to six.
Most mentioned word is "the", times two.
Total of letters equal to 27.
Most mentioned letter "e", times equal to five.

Information about the numbers mentioned is made at block 129 and is as follows:

Numbers mentioned equal to zero.

In this case there is nothing about numbers but as it will be explained next for other Sources this is very significant.

Implementation Using the Whole Bible as Source and Selected Text

The Bible is divided in two parts the Old Testament and New Testament. It is formed by books the first book is Genesis and last is Revelation. Each book is divided in chapter and each chapter in verses, the total of verses is 31,102. Old Testament has from verse 1 to verse 23,145 and New Testament from 23,146 to 31,102. This amounts are approximate because the exact quantity of verses depends of the version of the Bible.

When a citation from the Bible is done here It will be used the format "Book Chapter:Verse", for instance, Judges 7:14 where: "Judges" is the book, "7" is the chapter and "14" is the verse. Let's define "Consecutive" as the number of verse counting from the first verse, so Genesis 1:1 (the first verse in the Bible) will have a Consecutive equal to 1, Genesis 1:23 has the Consecutive 23, Genesis 1:30 has the Consecutive 30, for other books, for instance, Exodus 12:37 has Consecutive 1,854, this means that between Exodus 12:37 and Genesis 1:1 there are 1,854 verses. In the Bible version used for this description, the last verse of the Bible, which is Revelation 22:21, has the Consecutive 31,102.

The next computer programs are not only applicable for any version of the Bible but for any book written in any language by any author.

If User takes the Bible as Source at block 101, then at block 102 picks all its words and symbols as Selected Text, then at block 107 defines that the Slides of Text at block 106 are going to be only the words and symbols that are numbers. At block 111 the Mathematical Functions for relating the Slides of Text to the properties of the Main Objects are similar to the previous implementation mentioned above where FIG. 3D was generated and making the following considerations:

All the lines that represents the Main Objects will have as first point the coordinates (0,0).

The end point of each line will be given in polar notation (i.e. magnitude and angle). The magnitude is equal to logarithm base ten of the number that is mentioned at Slide of Text.

To evaluate the angle, as it was done for FIG. 3D, Delta is the angular distance between the Main Objects and it is equal to 360 divided by 7,026 (times that a number is mentioned), so Delta is equal to 0.0512° (approx.).

Figure 4A:
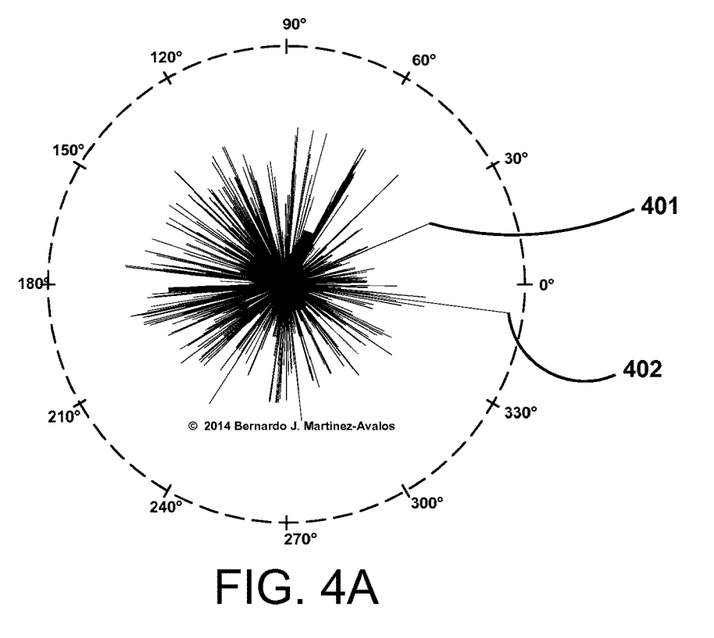
FIG. 4A is the Generated Image using as a Selected Text the whole Bible and considering all the numbers mentioned in this book.

Same as it was done to create FIG. 3D at block 116 is added an Auxiliary Object that links all the end points, then at block 117 all concentric lines are deleted. As a result is the Generated Image shown at FIG. 4A, which has 7,026 Main Objects because this is the amount of numbers Bible version used has. All the verses that mentions a number are at this figure, for instance point 401 represents the number 600,000 that is in at verse Exodus 12:37, Consecutive 1,854, its angle is 23.09° and distance to the center equal to the logarithm (base 10) of 600,000. Other example is at point 402 that represents the largest number in the Bible that is two hundred million, mentioned at Revelation 9:16, Consecutive 30,857, the angle is 352.65° and distance to the center equal to the logarithm (base 10) of two hundred million. The high concentration of lines at center of FIG. 4A is because short numbers like 1, 2 and 3 are mentioned many times in the Bible. This description of FIG. 4A is another example where New Text is created.

Figure 4B:
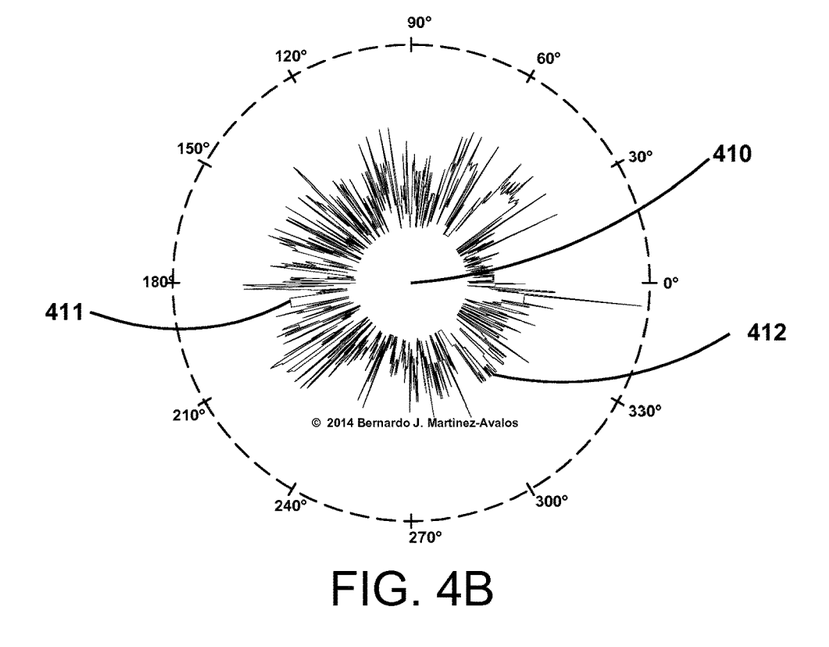
FIG. 4B is the Generated Image using as a Selected Text the whole Bible and considering the numbers that are equal or larger than one hundred.

To generate another image, for instance, lets define as rules at block 107 that the Slides of Text are going to be only those numbers higher or equal than one hundred, so after all the process already explained the Generated Image is shown at FIG. 4B where the empty space at center 410 is because numbers smaller than one hundred are not considered. At FIG. 4B there are a lot of silhouettes or contours that comes to our attention due its form, like silhouettes 411 and 412, this accomplishes one of the objectives of this invention that is to motivate to look deeper inside the books and written works. Many people seeing this silhouettes will want to know their causes therefore they will read and investigate about the text in the book, this is very useful for schools, churches, government and other institutions and to promote the culture and develop of men and women.

The Generated Images at FIG. 4A and FIG. 4B have never been seen until now. With a very simple algorithm the lines at 4A or FIG. 4B can be transformed in frequencies of different intensities to create a symphony or inspire musicians. Each length of the line is converted to a frequency.

Figure 5:
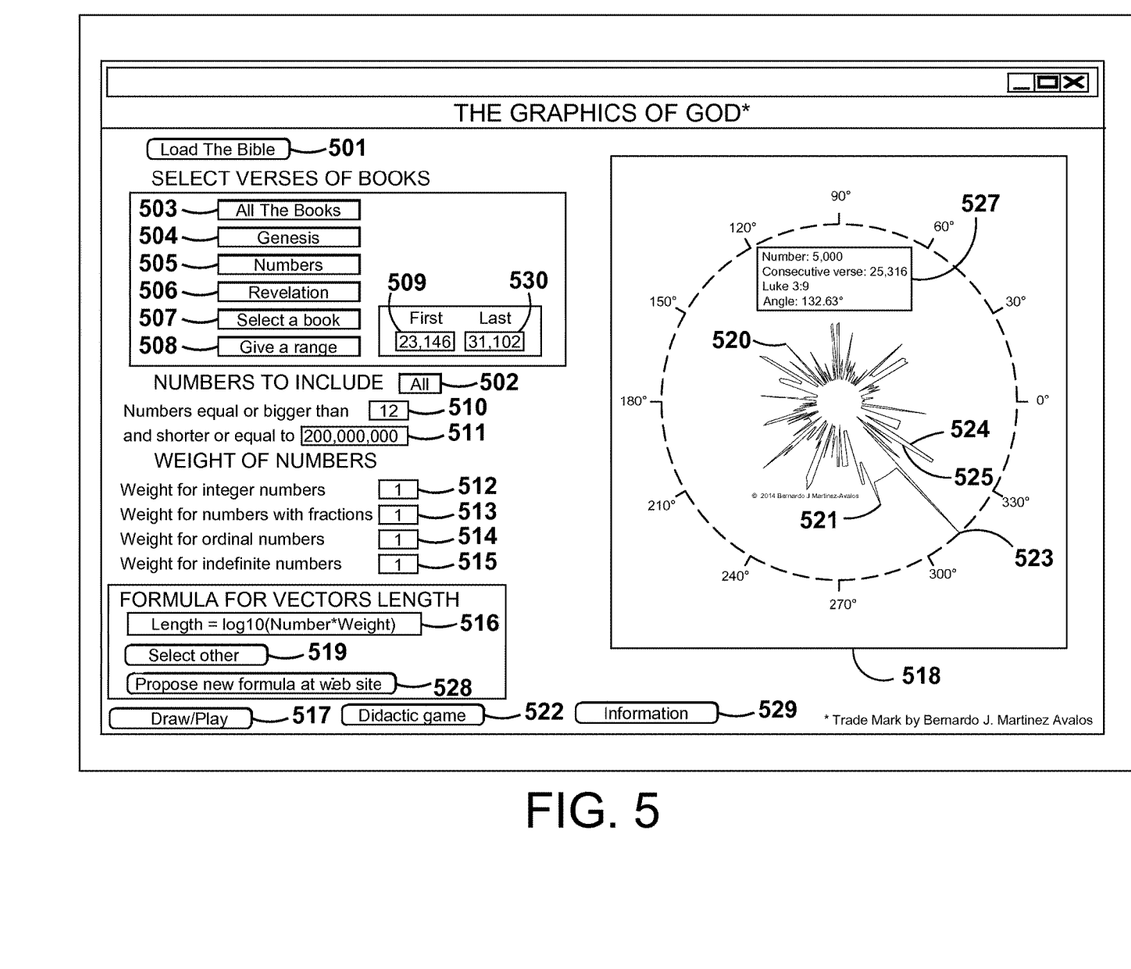
FIG. 5 illustrates an example of a device that can be configured to implement the invention where the computer program has the Bible as Source and User defines the numbers to consider.
Figure 7:
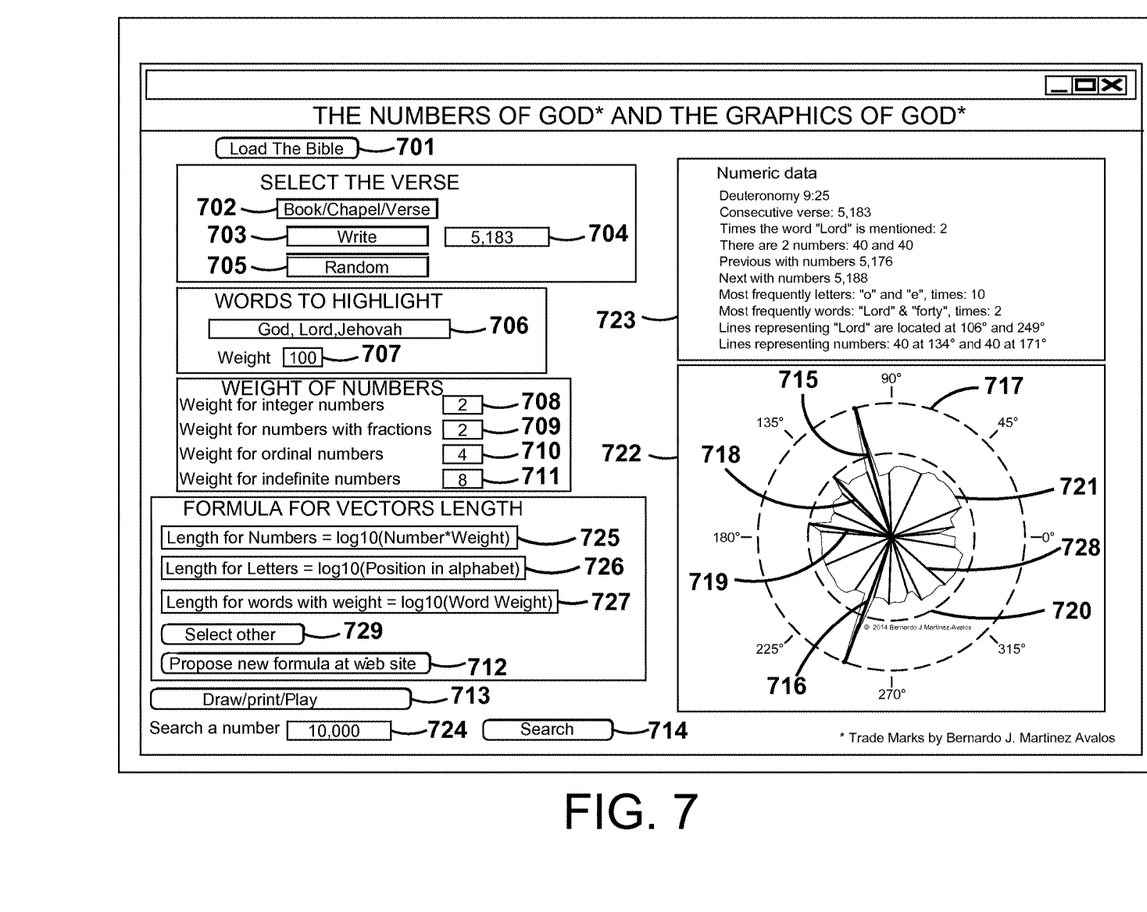
FIG. 7 illustrates another example of a device that can be configured to implement the invention where the computer program has as Source the Bible and User selects one verse as Selected Text.

Defining other rules, mathematical functions and other parameters using the method described at FIG. 1 it is possible to create more figures with extraordinary contours, the mean to achieve this automatically is by means of the computer programs depicted at FIG. 5 and FIG. 7, making possible create unlimited number of images and make iterations until the Expectations (103) are fulfilled. This programs can be implemented in any operative system for mobile devices, smart phones, desktops, laptops or any other computer device. The bottoms, forms, text windows, text boxes, displays and all the other objects that are shown at FIG. 5 and FIG. 7 are schematic, objects position, form, size and other properties depends of the computer device used, the operative system and design. With this two programs (FIG. 5 and FIG. 7) User can generate many images that represents any Bible verse changing data and rules making iterations (branches 127 and 126) to accomplish the Expectations (blocks 103, 114 and 124). Same method and program can be used to analyze and generate images for any book or any text wrote by any author in any language.

Program Using the Bible as Selected Text and Slides of Text are its Numbers

The computer program depicted at FIG. 5 illustrates an example of a computer device that can be configured to implement the invention. It creates images having as Source the whole Bible (block 101 of the method at FIG. 1), giving the User all the flexibility to change the rules (block 107) and the Selected Text (block 102) to create images. The task to select the Source (block 101) is done by means of bottom 501. Then to choose the Selected Text (block 102) User has a lot of possibilities using the bottoms 503, 504, 505, 506, 507 and 508 which are examples but not limitative because can be more bottoms or menus to increase the alternatives. If User picks bottom 503 the selected text is the whole Bible, bottom 504 the book Genesis, bottom 505 the book Numbers and bottom 506 the book Revelation. If User picks bottom 507 a new form is shown that has all the books of the Old Testament and New Testament to be selected. If User picks bottom 508, the text boxes at 509 and 530 appear to let User to write the range of Consecutives wanted, as an example, at text box 509 is written 23,146 as first Consecutive and at text box 530 is written 31,102 as last Consecutive, this range belongs to all the verses inside the New Testament from Matthew 1:1 to Revelation 22:21.

The numbers mentioned in Bible are from 0.1 to 200 million. If Users picks bottom 502 means that he wants this complete range of numbers. If User writes at text box 510, for example, the number twelve and at text box 511 the number 200,000,000, the numbers smaller than 12 are not considered (block 107 of method).

The Bible has four kinds of numbers: integers (examples: 1, 100 and 200), with fractions (examples: 0.5, 0.1 and 2.5), ordinals (examples: 1st, 2nd and 3rd) and indefinites (examples: hundreds, thousands and millions), at text box 512 User gives the weight to the integer numbers, at text box 513 to the numbers with fractions, at text box 514 to the ordinal numbers and at text box 515 to the indefinite numbers, as seen at FIG. 5 as example, User gives a weight equal to one to all the types of numbers.

The mathematical formula for relating the length of the lines with the numbers (block 111) is written at text box 516, the formula can be any that User writes because the program recognizes the most common mathematical functions or if User picks bottom 519 a menu of formulas appears to let him to choose another formula. As another approach picking bottom 528 a form is shown to let User to propose by means of Internet web page a new formula or new rules or new algorithms to be considered for the new versions of the program. At text box 516 as an example and not limitative the formula is the logarithm base ten of the number multiplied by its weight. When User picks bottom 517 the computer program draws (blocks 112 and 113) at display 518 the Generated Image. For this example, the Generated Image looks like a human shape, or like an angel, this is an extraordinary discovery never seen until now and as it was explained the data are the original Bible numbers. Button 517 have two functions: draw at 518 or play sounds using the speaker of the computer, an algorithm transforms the position of each point of the image to audible frequencies from 20 to 20,000 Hz to be hear by User. The frequency of the sounds is calculated in function of the length of the objects multiply by a constant.

One of the features of the program is that User picking any point of the graphic will see a text window, for instance if User picks the point 520, the text window 527 appears doing and showing the information (blocks 128 and 129) related to the point picked. If User picks point 523 text windows 527 will say that the number is two hundred million, the biggest in the Bible and will inform about the data of the Consecutive 30,857, the book, chapter and verse. If point 521 is picked text window will say that the number is one hundred forty four thousand, Consecutive 30,815 located at Revelation 7:4 and that same amount is in points at the end of line 524 (Consecutive 30,928 at Revelation 14:1) and line 525 (Consecutive 30,930 at Revelation 14:3). This description made about the image at slide 518 was used again to create New Text.

All of this features shows the didactic value of this invention. Picking bottom 529 the program displays all the information about statistics and characteristics of the numbers (block 129). The Bible mentions thousands of numbers its mathematical, philosophical, historical and theological importance is enormous. The potential of this invention is huge even to develop a lot of didactic games like the one that appears when User picks bottom 522 which consists of guess which book represents one Generated Image, the program generates randomly an image at display 518 and User has to guess which book is.

Figure 6A:
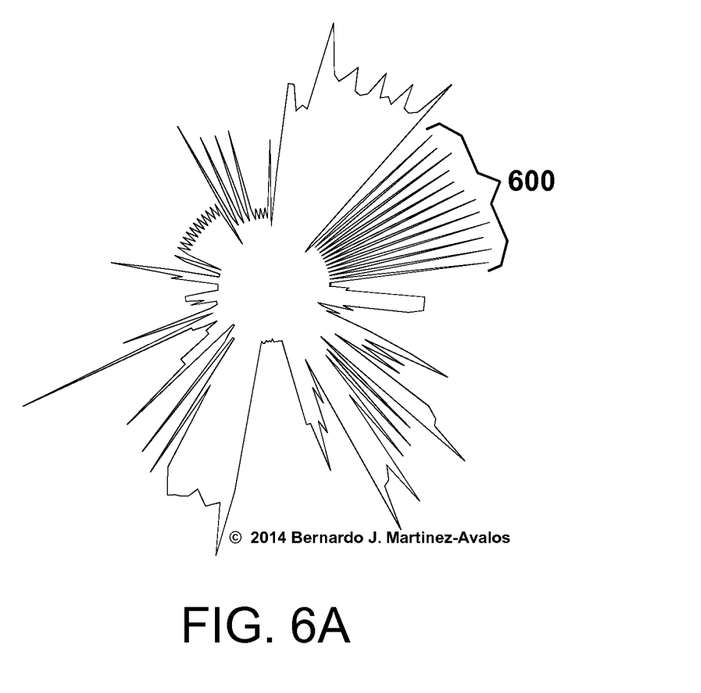
FIG. 6A is the Generated Image as one example of the results of the computer program at FIG. 5, using as a Selected Text the Bible book called Numbers.

More amazing Images can be created using the program described at FIG. 5, for example, if User picks bottom 505 only the text inside the fourth book of the Bible called Numbers will be considered as Selected Text, at text box 510 writes 12 and at text box 511 writes 200 million, the Generated Image at display 518 will be equal to FIG. 6A. The figure is impressive, especially because the twelve beams 600, twelve is the most important number in the Bible because there are twelve Tribes of Israel and twelve Apostles of Jesus. Here there is a lot of investigation material for historians and theologians. This discovery awakes the curiosity to read more and know why. As another example is when User selects by means of bottom 506 the book Revelation and writes at text box 510 the number six at FIG.

Figure 6B:
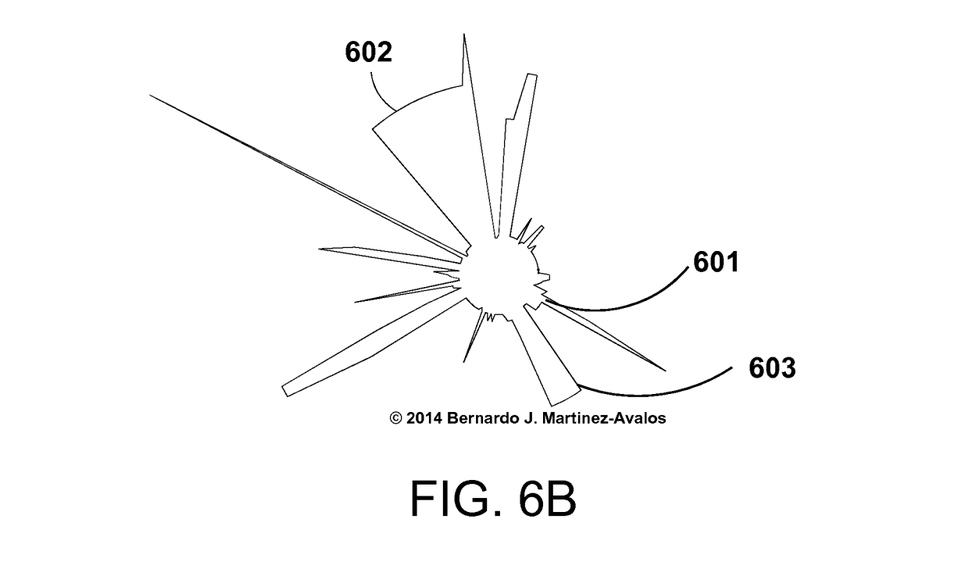
FIG. 6B is the Generated Image of another example of the computer program at FIG. 5, using as a Selected Text the Bible book called Revelation.

6B is the Generated Image, where silhouette 601 looks like a mouth, silhouette 602 like a hat and silhouette 603 like the neck.

Program Using the Bible as Source and Selected Text is a Verse

The computer program depicted at FIG. 7 illustrates another example of a computer device that can be configured to implement the invention. It draws at display 722 the graphics and at display 723 writes all the information about the numbers, words and letterers that there are in a single Bible verse. At bottom 701 the Bible is loaded as the Source, at bottom 702 User calls for a menu to select the book, chapter and verse (block 102 of method). Other alternative to select the verse is picking bottom 703 then text box 704 appears and User writes the Consecutive which can be from 1 to 31,102. Other option is picking bottom 705 and the program generates a random Consecutive. As an example at text box 704 is written the number 5,183. At text box 706 User writes the word or words separated by commas that wants to be highlighted at Generated Image (block 107 and 116) and at text box 707 User writes their weight (block 111), as an example at text box 707 is written one hundred as weight for the words "God, Lord and Jehovah" written at text box 706. At text boxes 708,709, 710 and 711 User gives the weigh (block 111), to the numbers depending their type. As an example, number 2 is written at text box 708, number 2 is written at text box 709, number 4 is written at text box 710 and number 8 is written at text box 711.

The Mathematical Functions (block 111) are the same used to construct FIG. 3C and the formulas to relating the length of the lines to the letters, numbers and words with weight are written by User at text boxes 725, 726 and 727 where as an example are written the formulas using the logarithm base ten, the program supports the most common mathematical functions. Besides has other options to select formulas when user picks bottom 729 to select from a menu or propose using bottom 712 other rules or formulas in an Internet web page to be considered in the next release of the program.

When picks bottom 713 the Generated Image is drawn at display 722 (block 113) and at display 723 all the information (blocks 128 and 129) about letters, words and numbers is written together with a description of the Generated Image. Other feature of this program is that written a number at text box 724 and picking bottom 714 this number is searched and printed at display 723 which Consecutive or Consecutives have the searched number, after User can generate the Image and information.

Button 713 have two options: to draw or to play sounds using the speaker of the computer, an algorithm transforms the position of each point of the image to audible frequencies from 20 to 20,000 Hz to be hear by User. The frequency of the sounds is calculated in function of the length of the objects multiply by a constant.

Since the Consecutive written at text box 704 is 5,183 at display 723 User is informed that is located at book Deuteronomy chapter 9 verse 25 (Deu 9:25), where the word "Lord" is mentioned two times, the number forty is mentioned two times, then it is written which are the previous and next verses with numbers (ie: 5,176 and 5,188). Then which are the most frequently letters and words, then an explanation about the Generated Image drawn at display 722. Line 715 located at 106° represents the Slide of Text "Lord", line 716 located at 249° represents "Lord" as well. The lines 718 and 719 represents the numbers found (i.e.: 40 and 40) which are located at 134° and 171°. Same as it was done for FIG. 3C the Auxiliary Object 721 is added (block 116) to link all the points that represents all the letters, the line 728 represents the first letter of the word "destroy" mentioned in the verse, the other concentric lines represents the first letter of the other words. The radii of circle 717 is equal to the length of the lines 715 and 716 that represents the word "Lord" and circle 720 radii is equal to the length of lines 718 and 719 that represents the number 40 and 40. This description uses again the method to create New Text.

If the User picks any point of the image at display 723 will be informed about the position and characteristics of the letter, number or word related with the picked point (blocks 128 and 129).

Figure 8A:
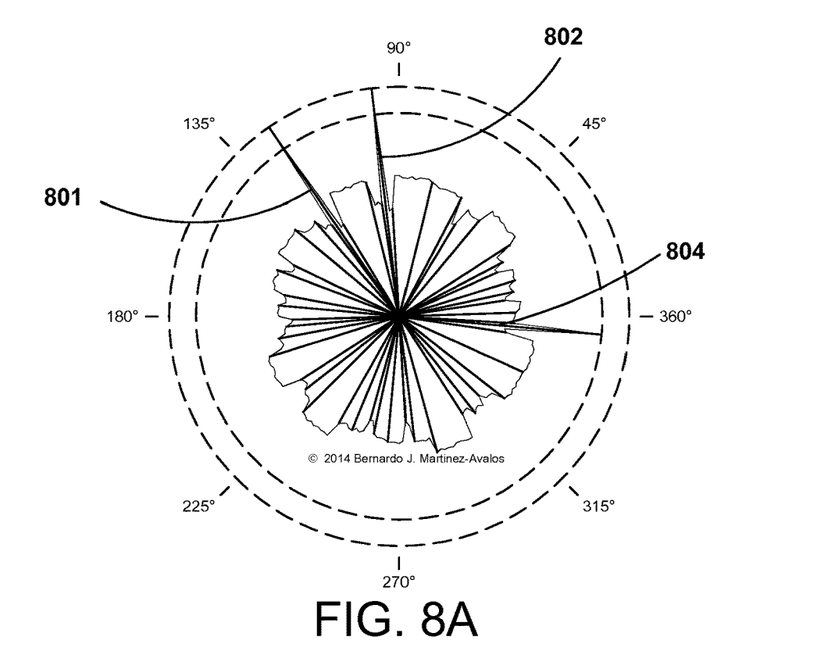
FIG. 8A is the Generated Image of one example of the computer program at FIG. 7, using as a Selected Text the verse located at 1-Chronicles 27:1.
Figure 8B:
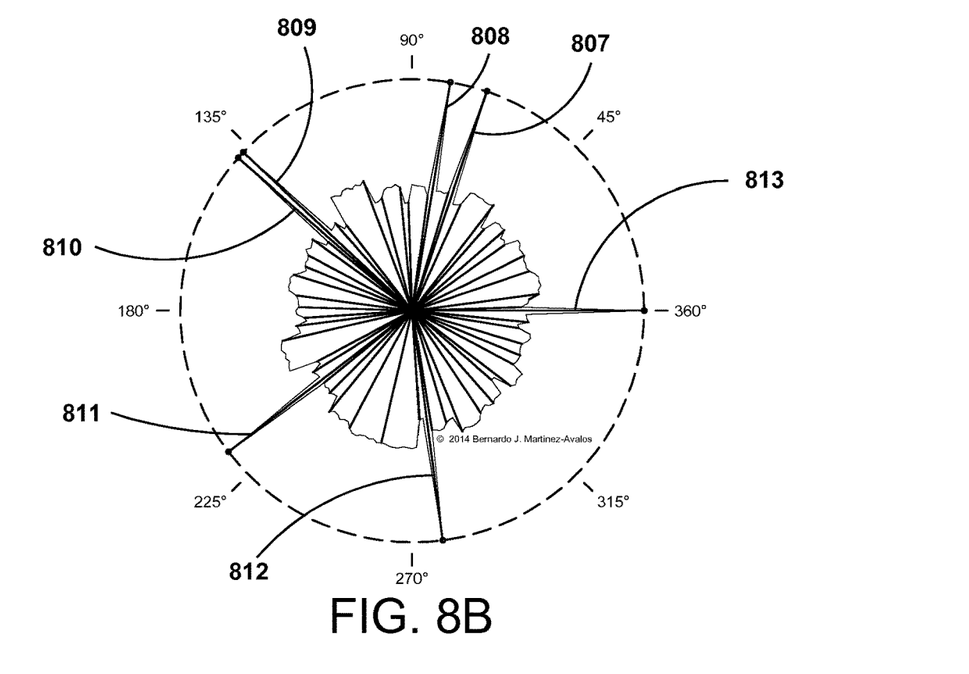
FIG. 8B is the Generated Image of another example of the computer program at FIG. 7, using as a Selected Text the verse located at 1-Chronicles 22:19

Other example is if User writes at text box 704 the Consecutive 11,111. At this verse located in the Bible at 1-Chronicles 27:1, God, Lord or Jehovah are not mentioned but it has three numbers one is the indefinite number "thousands" represented at FIG. 8A as line 802, the indefinite number "hundreds" is represented by line 801 and the last is the number 24,000 represented at line 804. At FIG. 8B is represented other verse with Consecutive 10,984 located in the Bible at 1-Chronicles 22:19 it is the verse that is the one having more mentions of God with a total of seven times which are represented by lines 807,808, 809, 810, 811, 812 and 813 as can be seen the form of this lines is like a cross.

The invention claimed is:

1. A method performed by a computing device to display an output comprising an image generated based on an input of a selected text from sources, wherein the sources comprise at least one of books, newspapers, songs, letters, documents, speeches or any written item, the method comprising;

selecting, by the computing device, a source from among the sources;

selecting, by the computing device, the text from among the selected source;

defining, by the computing device, expectations for the image;

building, by the computing device, a transformed text from the selected text;

dividing, by the computing device, the transformed text into slides of text;

generating, by the computing device, man objects for respective slides of text, each of the main objects being a graphical element that represents the respective slides of text;

defining, by the computing device, a shape and properties of respective main objects;

defining, by the computing device, mathematical functions for relating the properties of the respective main objects to the respective slides of text;

obtaining, by the computing device, numerical values for the respective slides of text based on the mathematical functions and the properties of the respective main objects, wherein the obtained numerical values include magnitude of the respective slides of text and an angle of the respective slides of text;

building, by the computing device, scripts for generating the image, based on the shape of the respective main objects and the numerical values for the respective slides of text;

generating, by the computing device, the image on a polar coordinate system in accordance with the scripts;

displaying, by the computing device, the image generated;

displaying, by the computing device, the output that comprises the image generated upon the defined expectations for the generated image being fulfilled; and when the defined expectations are not fulfilled, performing, by the computing device, interactive processes until the defined expectations for the generated images are fulfilled.

2. The method of claim 1, wherein the output is other text.

3. The method of claim 1, wherein the output is a printed figure.

4. The method of claim 1, wherein the output has attributes, wherein the attributes comprise at least one of color, temperature or any other attributes to be seen, heard, smelled or felt.

5. The method of claim 1, wherein the output further comprises sounds or music, and wherein the method further comprises evaluating a frequency of a sound based on the mathematical functions and the properties of the respective main objects, and generating the sounds or music based on the evaluated frequency of the sound.

6. The method of claim 1,
wherein the shape of the respective main objects includes a point, a line, a circle, a square, a sphere;
wherein the shape of the respective main objects is the line and the mathematical functions includes:
defining a first point of the respective main objects as coordinate (0,0),
defining magnitude of the respective main objects based on logarithm, and
defining a delta as an angular distance between the respective main objects to evaluate an angle of the respective main objects on the polar coordinate system; and
wherein the obtaining numerical values for the respective slides of text includes determining the magnitude of the respective main objects as the magnitude of the respective slides of text, and determining the evaluated angle of the respective main objects as the angle of the respective slides of text.

7. A non-transitory computer-readable storage medium having stored thereon computer executable instructions that, in response to execution, cause a computing device that displays an output comprising an image generated based on an input of a selected text from sources, to perform operations comprising:
selecting, by the computing device, a source from among the sources;
selecting, by the computing device, the text from among the selected source;
defining, by the computing device, expectations for the image;
building, by the computing device, a transformed text from the selected text;
dividing, by the computing device, the transformed text into slides of text;
generating, by the computing device, main objects for respective slides of text, each of the main objects being a graphical element that represents the respective slides of text;
defining, by the computing device, a shape and properties of respective main objects;
defining, by the computing device, mathematical functions for relating the properties of the respective main objects to the respective slides of text;
obtaining, by the computing device, numerical values for the respective slides of text based on the mathematical functions and the properties of the respective main objects, wherein the obtained numerical values include magnitude of the respective slides of text and an angle of the respective slides of text;
building, by the computing device, scripts for generating the image, based on the shape of the respective main objects and the numerical values for the respective slides of text;
generating, by the computing device, the image on a polar coordinate system in accordance with the scripts;
displaying, by the computing device, the image generated;
displaying, by the computing device, the output that comprises the image generated upon the defined expectations for the generated image being fulfilled; and
when the defined expectations are not fulfilled, performing, by the computing device, interactive processes until the defined expectations for the generated images are fulfilled.

8. The non-transitory computer-readable storage medium of claim 7, wherein the sources comprise at least one of a book, a newspaper, a song, a letter, a document, a speech or any written item.

9. The non-transitory computer-readable storage medium of claim 7,
wherein the selected source is the Bible, the selected text is one verse of the Bible, the slides of text comprise all words and numbers in the selected one verse of the Bible,
wherein the defining mathematical functions include:
selecting, among the all words, words to be highlighted in the image generated,
defining a weight for the words and the numbers of the slides of text, and
defining mathematical functions for vectors length for respective words and numbers based on the weight, and
wherein the output further comprises statistical data regarding the selected text.

10. The non-transitory computer-readable storage medium of claim 7, wherein the selected source is the Bible, and the selected text is one of the whole Bible, a range of verses of the Bible, a verse of the Bible, or a part of the verse,
wherein the building the transformed text includes selecting numbers mentioned in the selected text of the Bible based on a predetermined range of numbers, and building the transformed text with the selected numbers of the Bible,
wherein the slides of text comprise the selected numbers,
wherein respective main objects is a graphic element that represents the respective slides of text, and the shape of the respective main objects is a line,
wherein the defining mathematical functions include defining formulas for vectors length using a weight for the selected numbers for the slides of text, and
wherein the operations further comprise receiving a user input that picks a point of the displayed image generated and displaying information regarding the point of the displayed image, the information includes characteristics of a number associated with the point of the displayed image and a location of the number in the Bible.

11. The non-transitory computer-readable storage medium of claim 7, wherein the output further comprises sounds or music, and wherein the operations further comprise evaluating a frequency of a sound based on the mathematical functions and the properties of the respective main objects, and generating the sounds or music based on the evaluated frequency of the sound.

* * * * *